UNITED STATES PATENT OFFICE.

JOHN HENRY HOOKER, OF WINSLOW, ENGLAND.

MILK WINE AND PROCESS OF MAKING THE SAME.

SPECIFICATION forming part of Letters Patent No. 455,210, dated June 30, 1891.

Application filed October 21, 1890. Serial No. 368,843. (Specimens.)

*To all whom it may concern:*

Be it known that I, JOHN HENRY HOOKER, a subject of the Queen of Great Britain, residing at Winslow, England, have invented certain new and useful Improvements in the Manufacture of Vinous Alimentary Liquids, of which the following is a full, clear, and exact specification.

This invention has for its object to produce from either peptonized milk or from milk in the natural state a vinous or alcoholic liquid food which is clear and brilliant, similar to pale sherry, contains peptones in solution, and comprises milk either peptonized or in the natural state, which has been sterilized by boiling to destroy germs of lactic fermentation, is acidulated to convert the sugar of milk into a glucose called "galactose," and to prevent the working of any lactic germs escaping the boiling operation, and is subjected to pure alcoholic fermentation, whereby the proteid matters in the milk are converted into or retained in the form of peptones in solution, in which form the said matters are capable of assimilation by absorption into the system without undergoing the process of digestion.

To accomplish the object of my invention, I take milk either in its natural state or after it has been peptonized and boil the milk to destroy all germs of lactic fermentation which may be present. I then permit the milk to cool and add to every gallon thereof about six fluid ounces of vegetable acid, such as pure lime-juice or lime and lemon juice in admixture; or I add citric acid or other suitable vegetable acid in sufficient quantity to produce about the same degree of acidity as is produced by the addition of the stated quantity of lime or lemon juice. By this step the milk is acidulated to convert the sugar of milk into a glucose called "galactose," which is directly fermentable, and to prevent the working of any lactic germs which may have escaped the boiling process. To each gallon of the sterilized milk is added about four pounds, by weight, of cane-sugar or other suitable saccharine matter. The mixture is now subjected to pure alcoholic fermentation by adding about two fluid ounces of pure brewers' yeast to every three gallons of the mixture. The liquor is set to ferment and the fermentation, purely alcoholic, continues actively for a period varying from three to six weeks or longer. The acidulation of the liquor renders special precautions unnecessary, and I avoid accelerating the fermentation by churning or other means. When the fermentation has run its natural course and the alcohol produced amounts to about ten per cent., I simply pour the liquor away from lees and sediment and bring it down in casks, leaving it with occasional rackings to fine for some months before bottling. Whether the milk to be treated be peptonized or not, I prefer to separate the cream therefrom before treating it according to my invention, as the cream or the greater part thereof, if not removed prior to treating the milk, separates therefrom during the process of fermentation, and is therefore lost.

The kinds of vegetable acid which are suitable for addition to the milk, as hereinbefore described, are such as are innocuous and of agreeable flavor and have no power to precipitate peptones. Any fermentable glucose or any saccharine matter other than milk-sugar is suitable for use according to my invention, as hereinbefore described. I however prefer to use cane-sugar.

The product resulting from my treatment of milk, whether peptonized or not, is a clear and brilliant alcoholic liquid containing proteid matters or peptones in solution.

As hereinbefore stated, both milk in the natural state and milk which has peptonized are capable of treatment according to my invention in the preparation of the liquid food which it is the object of my invention to produce. I however prepare peptonized milk for such treatment, as where the said liquid food is prepared from peptonized milk the whole of the proteid matters or peptones in solution therein is retained in the resulting product, whereas the product obtained by treatment of milk which has not been peptonized contains a portion only of the proteid matters or peptones in solution.

The proportions of saccharine matter, acid, and pure brewers' yeast hereinbefore stated are those which I have found to produce good results; but I do not limit myself to such proportions.

By my invention I entirely avoid lactic fermentation and replace it by pure alcoholic fermentation, while instead of the coagulated caseine in suspension, as in koumiss, I obtain peptones in solution, in which form the proteid matter is capable of absorption into the system without digestion.

My new vinous or alcoholic liquid is entirely different in appearance and otherwise from koumiss, and the preparation of my product differs from the latter in principle, for I destroy all germs of lactic fermentation by boiling the milk and convert the sugar of milk into galactose by acidulation, and add cane-sugar or other fermentable glucose to the milk in contradistinction to milk-sugar, which would increase the difficulty of preventing the lactic fermentation.

I am aware that certain preparations made by fermentation of milk have long been known, koumiss being one of the most generally known of such preparations; but in the case of all such known preparations both the processes of manufacture and the resulting products have been different from mine in the following essential respects.

First. The kind of fermentation to which the milk has been subjected in the manufacture of the said known products has been in all cases, without exception, either entirely or mainly lactic fermentation, whereas I subject the milk to pure alcoholic fermentation only and avoid the introduction of any matter which is known to have any tendency to produce or to favor lactic fermentation.

Second. In consequence of the lactic fermentation to which the milk has been subjected in the manufacture of the said known preparations (including every known kind of koumiss) the said preparations are without exception subject to rapid deterioration, many being quite unfit for use after having been made a few weeks and none being fit for use after being made more than a few months; and in consequence of the proteid matters present in the milk having been coagulated by the lactic acid they are, when taken into the stomach, incapable of assimilation by the system until they have undergone the process of digestion, whereas the products obtained by treating milk according to my invention may (like wine) be kept an indefinite time before being used and are improved by keeping. Further, in my products the whole of the proteid matter present is in the form of peptones in solution, in which form the said matter is capable of passing into the system by mere absorption. Therefore, as compared with every kind of koumiss and every other preparation heretofore made by fermenting milk or by treating milk by any other known method, my said product is of essentially different nature, in that it is a food free from liability to objectionable chemical change and containing the most nutritive constituent of milk in a form eminently suited for the sustenance of persons whose power of digestion is impaired or inoperative.

The properties of my said product which I have thus adverted to in contradistinction to those of koumiss and other like known products heretofore made from milk are the result of the radical differences between my process, hereinbefore described, and the processes to which milk is subjected in the manufacture of the said known products.

I may further remark that my said product is also entirely different in appearance from koumiss and other like preparations made from milk, my said product being clear and brilliant and of a pale amber tint, whereas koumiss is thick, opaque, and white.

Having thus described my invention, what I claim is—

1. The process herein described of manufacturing vinous alimentary liquids, which consists in boiling milk to destroy lactic germs, acidulating the milk and converting the sugar of milk into galactose, adding saccharine matter and pure brewers' yeast to maintain pure alcoholic fermentation, and produce peptones in solution by conversion of the caseine, substantially as set forth.

2. The process herein-described of manufacturing vinous alimentary liquids, which consists in boiling peptonized milk to destroy lactic germs, acidulating it, and converting the sugar of milk into galactose, adding saccharine matter and pure brewers' yeast to maintain pure alcoholic fermentation and retain the peptones in solution, substantially as set forth.

3. A fully-alcoholized liquid prepared from milk and entirely free from lactic acid, in which liquid all constituents of the milk except the fat are present and in which the whole of the proteid matter present is in the form of peptones in solution, as described.

4. A fully-alcoholized liquid prepared from peptonized milk and entirely free from lactic acid and containing the peptones of the said milk in solution, as described.

JOHN HENRY HOOKER.

Witnesses:
ALFRED DONNISON,
WILLIAM THOMAS WHITEMAN.